United States Patent
Cepulis

(10) Patent No.: US 7,353,375 B2
(45) Date of Patent: Apr. 1, 2008

(54) METHOD AND APPARATUS FOR MANAGING PROCESSOR AVAILABILITY USING A MICROCODE PATCH

(75) Inventor: Darren J. Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 10/960,529

(22) Filed: Oct. 7, 2004

(65) Prior Publication Data

US 2006/0080523 A1   Apr. 13, 2006

(51) Int. Cl.
G06F 9/00 (2006.01)
G06F 15/177 (2006.01)
G06F 1/24 (2006.01)
(52) U.S. Cl. .............................. 713/1; 713/2; 713/100
(58) Field of Classification Search ................. 713/1
See application file for complete search history.

(56) References Cited

U.S. PATENT DOCUMENTS

| | | | |
|---|---|---|---|
| 5,796,974 A | 8/1998 | Goddard et al. | |
| 6,438,664 B1 | 8/2002 | McGrath et al. | |
| 2002/0169976 A1* | 11/2002 | Schelling et al. | 713/200 |
| 2003/0196096 A1* | 10/2003 | Sutton | 713/181 |
| 2005/0273601 A1* | 12/2005 | Buch et al. | 713/161 |
| 2006/0036889 A1* | 2/2006 | Arai | 714/1 |

* cited by examiner

Primary Examiner—James K. Trujillo
Assistant Examiner—Stefan Stoynov

(57) ABSTRACT

A method and apparatus for managing processor availability uses a disabling microcode patch to prevent unauthorized processor(s) usage. By loading the disabling microcode to one or more processors that are not authorized to be in operation (e.g., not currently licensed, etc.) the OS can not circumvent the disablement.

23 Claims, 3 Drawing Sheets

US 7,353,375 B2

METHOD AND APPARATUS FOR MANAGING PROCESSOR AVAILABILITY USING A MICROCODE PATCH

BACKGROUND

Capacity-on-demand (COD) computer systems such as COD servers have become very popular because they allow computer system users to add extra computing capacity on demand when it becomes necessary. A COD system will include additional processors that are not functional when a customer first receives the COD system. When additional processing capability is required, the COD system user pays for the additional processing capability and one or more of the currently nonfunctional processor(s) are activated. Some previous COD computer systems used a proprietary controller operating system (OS) along with built-in software to monitor processor licensing and usage. This made it almost impossible for COD system users to misappropriate computational resources that were not yet paid/licensed for use.

In the last few years, open-source operating systems (e.g., Linux, etc.) have become very popular given that they provide users with a more open OS environment that can be easily customized for specific customer requirements. However, since open-source operating systems place fewer restrictions on the OS and its associated software, it becomes more difficult to prevent unauthorized usage of COD resources in a COD system (e.g., COD server) that runs an open-source OS.

NOTATION AND NOMENCLATURE

Certain term(s) are used throughout the following description and claims to refer to particular system components. As one skilled in the art will appreciate, different companies/industries may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
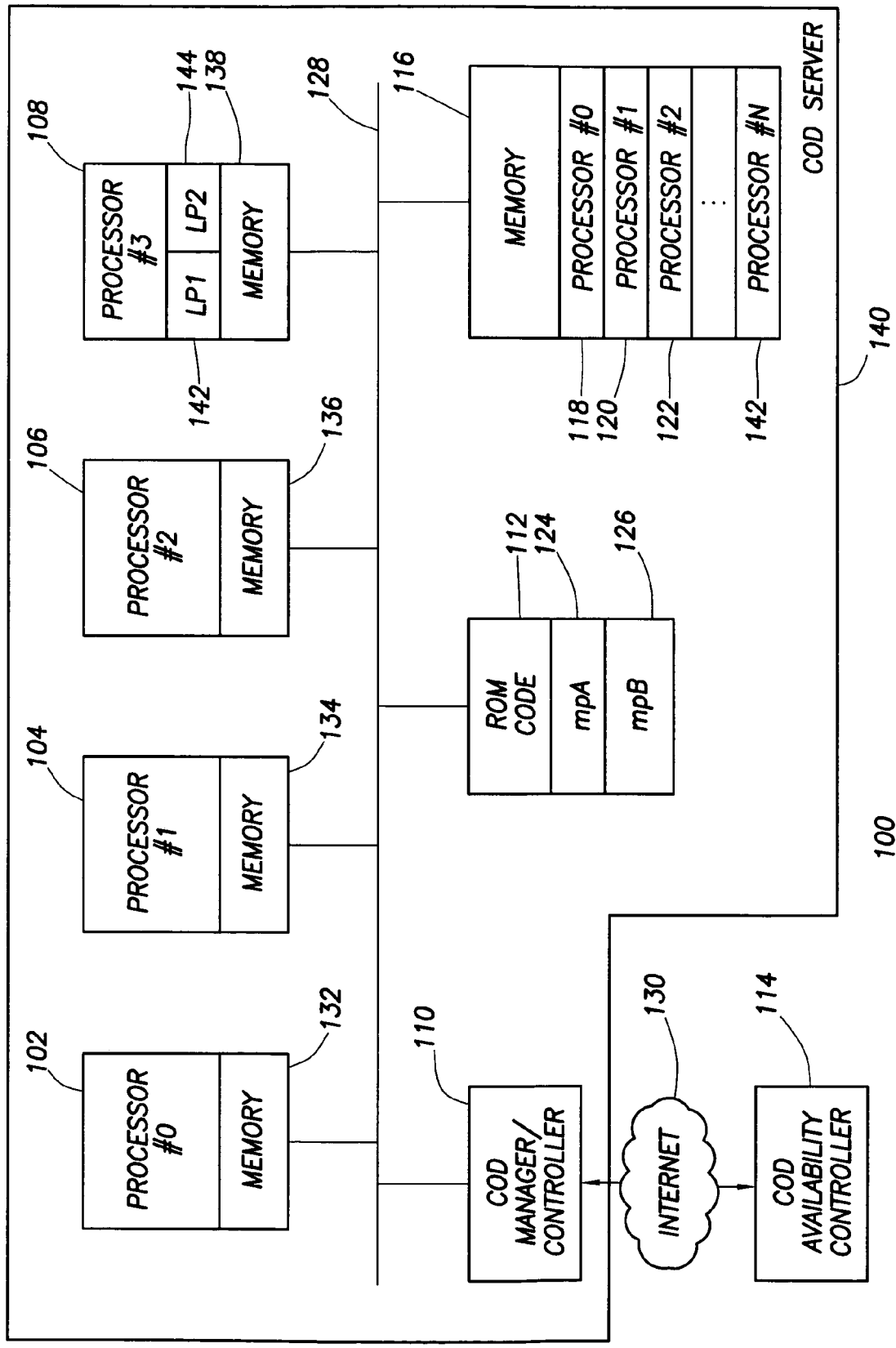
FIG. 1 shows a block diagram of a COD computer system in accordance with an embodiment of the invention.

Referring to FIG. 1, there is shown a computer system such as a COD system 100 that includes a COD server 140 and a COD availability controller 114. The COD server 140 includes a plurality of processing resources (labeled processors #0-3) 102-108. The processing resources 102-108 can comprise any number of processor boards, etc. depending on the particular system design. The processing resources or processors 102-108 can comprise both physical processors and/or, logical processors. Logical processors are processor cores found in physical processors 102-108 that have more than one processor core embedded in them. Physical processor 108 is shown having two logical processors LP1 142 and LP2 144. The logical processors 142 and 144 can have their own built-in memory or can share memory space from memory 138 depending on the particular design. The processing resources 102-108 are coupled via a network 128 to a COD manager/controller 110 that manages the operation of the plurality of processors 102-108. The COD manager/controller 110 is coupled to a COD availability controller 114 which may be, in an illustrative example, a locally or remotely located controller. In the example shown, the availability controller 114 is coupled to the COD server 140 via the Internet 130, although any other type of communication link can be used (e.g., local area network, wide area network, public switched telephone network, etc.). The COD availability controller 114 helps keep track and control of which of the processors 102-108 in the COD server are currently authorized to be functional and which are not available to the users of the COD server. This information can be stored in a table (not shown) found in the COD availability controller or elsewhere.

A system read-only-memory (ROM) 112 is located in the COD server 140 and includes the ROM code required by the COD server 140 to boot up. During the boot up process a shadow copy of the system ROM is loaded in memory 116 for all the processors 102-108 to share (in the case of processor 108, this would also include logical processors 142-144). In accordance with one embodiment of the invention, the ROM 112 includes a first micropatch (mpA) 124 and a second microcode patch (mpB) 126. The first microcode patch (mpA) 124 is loaded prior to boot-up to all of the processors 102-108 which are currently authorized to be in operation as part of the COD server 140. Authorized processors are those that, for example, may be licensed to the COD server user. Prior to boot-up of the COD server 140, the first microcode patch 124 is loaded into the memory 132-138 of those authorized processors, for example memory 132 for processor (processor #0) and memory 134 for processor (processor #1) 104. The first microcode patch 124 when loaded allows the processors 102 and 104 to boot-up in a normal (operational) fashion.

In accordance with an embodiment of the invention, a second microcode patch (mpB) 126 is loaded by COD manager/controller 110 into the memory of those processor(s) that are not authorized to be in operation. For example, if processors 106 and 108 are not currently authorized to be in operation, the second microcode patch 126 is loaded into memory 136 for processor 106 and in memory 138 for processor 108. The second microcode patch 126 comprises a dummy or disabling microcode patch that causes the processors 106 and 108 to become disabled and nonfunctional or cause them to operate in a reduced operational state (e.g., may not be able to perform all tasks a fully operational processor can perform) as part of COD server 140.

Although the microcode patches 124 and 126 are shown loaded in the ROM, they could be located anywhere and associated with their respective processors. As an illustrative example, the microcode patch(es) could be located in memory 116 or provided remotely via COD availability controller 114 or some other remote location. In the case the availability status of a processor 102-108 changes while COD server 140 is already booted and operational, the COD server 140 would need to be reset or power-cycled in order for all of the processors to reboot and the proper microcode patch to become loaded.

The actual contents of the microcode patch 126 can vary and can also depend on the particular system design requirements. In the case where one of the processors 102-108, for example processor 108 includes a plurality of separate processor cores 142 and 144, each individual processor core (logical processor) that is not supposed to be active gets loaded with the second microcode patch 126 and thus each logical processor can be disabled individually by using the disabling microcode patch 126. As an illustrative example, if logical processor 142 is supposed to be inactive, it is loaded with the second (disabling) microcode patch 126, while if logical processor 144 is supposed to be active, it is loaded with the first microcode patch 124 that allows for normal operation. In the case of a logical processor 142, 144 the microcode patches can be loaded onto onboard memory or shared memory such as for example memory 138 or remotely located memory depending on the particular design.

Although the above embodiment discussed using a first microcode patch 124 for processors that are authorized for use and a second or disabling microcode patch 126 for those processors not authorized for use, in another embodiment were a microcode patch may not be needed for processors that are authorized, only a disabling microcode patch 126 is provided to those processors that are determined to be unauthorized to be in operation.

The COD manager/controller 110 can also omit any of the unauthorized processor(s) from the basic input/output system (BIOS), the multi-processor specification (MPS) and/or the advanced configuration and power interface (ACPI) tables that are located in memory 116 in locations 118-122, in order to further "hide" the processors from the COD server's OS and thus stop the processors that are not currently licensed/paid for from being used illegally. The ACPI and MPS tables are modified to remove the processors that have been disabled so that the OS does not see them as available and attempt to launch a disabled processor. Note that even if the OS did see a microcode disabled processor as available in one or more of the tables, the processor would still not launch successfully. If a processor is disabled via a patch prior to boot up of COD server 140, there is no way for it to have a patch loaded after boot up. If a new patch is to be loaded for one or more of the processors after boot up, the COD server 140 would have to be reset.

The second or disabling microcode patch 126 effectively disables the one or more processor(s) from functioning normally, even if the OS were able to find the microcode patch 126. For example, the disabling microcode patch 126 could disable the local APIC interface, and/or disable a processor's ability to respond to any startup commands and/or disable the ability to load a new microcode patch onto the processor until the next power-up cycle. All authorized processors would continue to have entries in the MPS and ACPI tables, and would obtain their proper functioning microcode patch(s) 124 during boot-up.

The COD availability controller 114 communicates with the COD server 140, for example, remotely via the Internet 130 or via other suitable communication means. The COD availability controller 114 keeps track of which of the processors 102-108 are currently available for use (e.g., license fee has been paid for there use) and which processors are currently unauthorized for use. In one embodiment, the COD availability controller 114 keeps a table of those processors 118-122 which are authorized for use (e.g., this information may come from system licensing information) and this information is forwarded to the COD manager/controller 110. The authorized processor information may be transferred from COD availability controller 114 in an encrypted format to further protect the information from unauthorized changes. In another embodiment of the invention, the COD availability controller 114 can also transfer updated microcode patches (mpA, mpB) 124, 126 to the COD server 140.

The COD availability controller 114 can also change the status of a processor 102-108 from "not available" to "available for use" and vice versa, depending on the particular system design. The COD server user(s) can, for example, pay the extra cost to activate one or more of the additional processors that may be currently unavailable. The activation of one or more of the processors 102-108 by the COD availability controller 114 can be for any period of time depending again on the particular system design requirements. The COD availability controller 114 controls which of the microcode patches 124 or 126 is loaded into which processors 102-108 based on the information the controller 114 has relating to the COD server 100. Although it has been mentioned that one microcode patch 124 is loaded onto all of the authorized processors and a second microcode patch 126 is loaded onto all of the unauthorized processors, any number of microcode patches can be used with the invention. For example, in a particular system design, a different "good" microcode patch, can be loaded onto each of the authorized processors.

Figure 2:
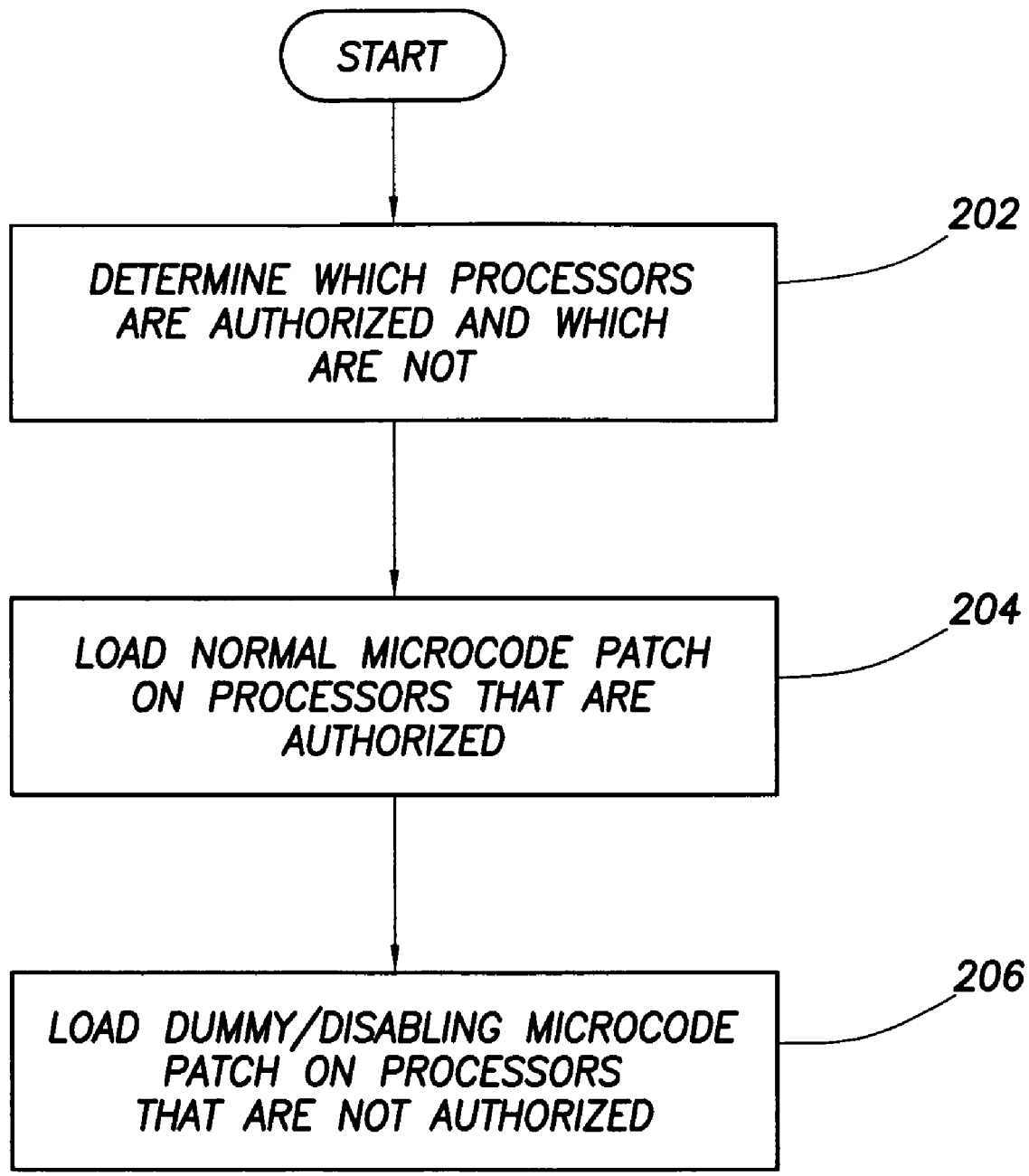
FIG. 2 shows a flow chart highlighting how processor resources are managed in accordance with an embodiment of the invention.

In FIG. 2, there is shown a simplified flow diagram highlighting some of the steps taken in accordance with one embodiment of the invention. In step 202, the COD availability controller 114 determines which of the processors 102-108 in the COD server 140 are authorized for use and which are not. This step can, for example, be accomplished by the COD availability controller 114 querying a table (not shown) which keeps track of which of the processors 102-108 have been authorized for use (i.e., number of processors that have been licensed/paid for, etc.). In 204, the COD availability controller 114 sends a control message to the COD manager/controller 110 which causes the appropriate microcode patch mpA 124 for the authorized processors and the microcode patch mpB 126 for the currently unauthorized processors to be loaded prior to the COD server's booting in the appropriate processor's memory 132-138. The disabling microcode patch (mpB) 126 as mentioned previously can disable an unauthorized processors local APIC interface, and/or disable the processor in any one or more number of ways so that it fails to properly boot up or enter into an operational state.

Figure 3:
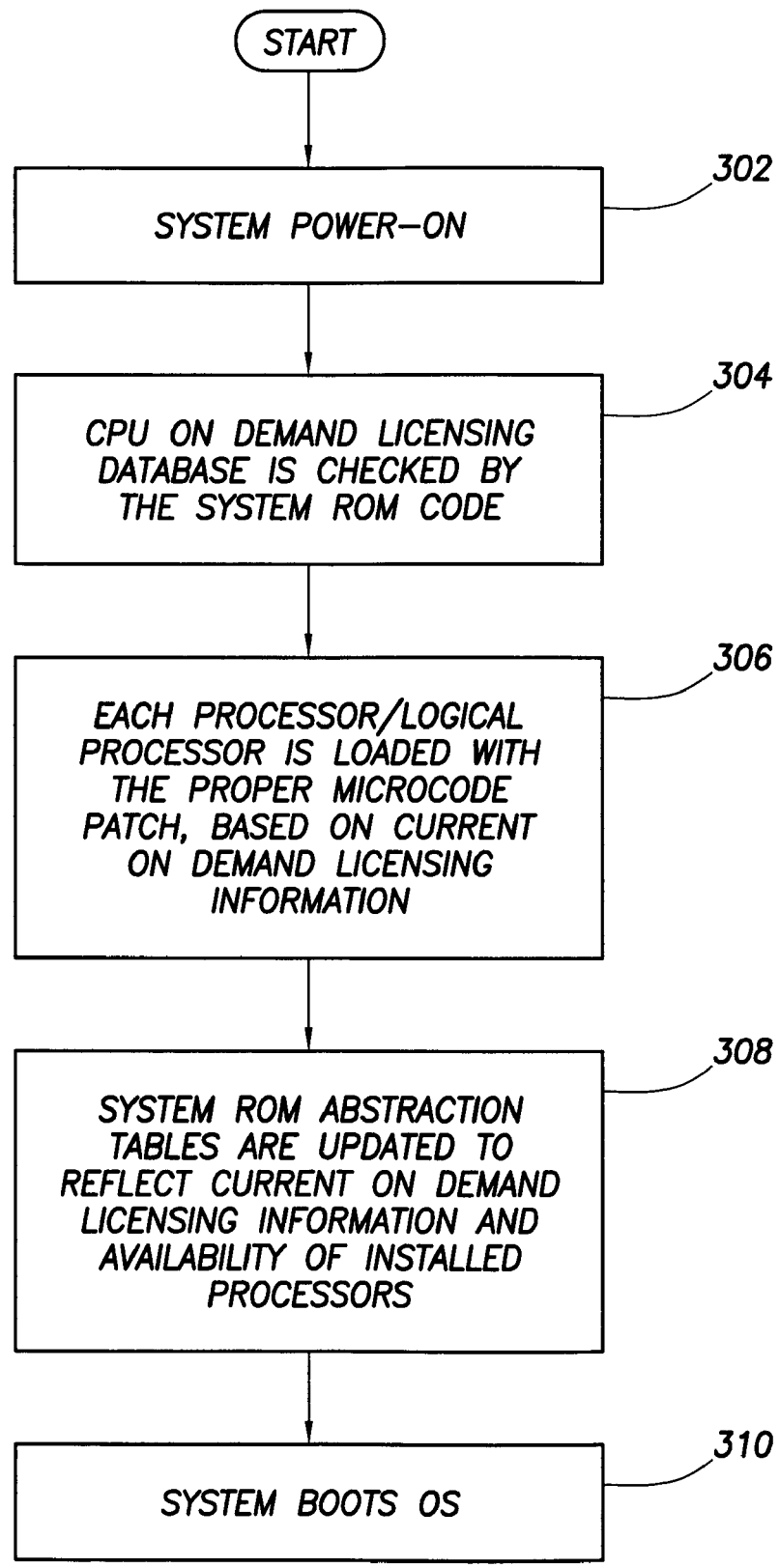
FIG. 3 shows a flow chart highlighting a COD server boot up routine in accordance with an embodiment of the invention.

Referring now to FIG. 3, there is shown a flowchart highlighting some of the steps taken during power-up of the COD server 140. In 302, in the system power-on, power is applied to the COD server 140. In 304, a processor (also referred to as a central processing unit, CPU) on demand licensing database is checked by the system ROM code stored in ROM 112. In 306, each processor 102-108 and logical processor 142 and 144 is loaded with the proper microcode patch 124 or 126 (or just 126 in another embodiment), based on the current on demand licensing information. The system ROM abstraction tables (e.g., ACPI, MPS, SMBIOS, etc.) are updated to reflect current on demand licensing information and processor availability of the installed processors. Finally, in 310, the COD server 140 boots the OS. In an alternate embodiment, boot up for COD server 140 or for individual processors can also occur from a command from the COD manager 110 and/or COD availability controller 114 without having to turn the power off/on.

The above discussion is meant to be illustrative of the principles and various embodiments of the present invention. Numerous variations and modifications will become apparent to those skilled in the art once the above disclosure is fully appreciated. For example, although a COD server 140 has been discussed in one embodiment of the invention, the invention is not so limited and can be used for other types of multiprocessor systems. The invention provides for a secure method of blocking illegal access to unpaid/unlicensed computational resources, especially when those resources use an open source OS. It also should be noted that the invention can be used in computing systems that use either open source or standard operating systems.

What is claimed is:

1. A capacity-on-demand (COD) system, comprising
    a processor; and
    a memory storage area, coupled to the processor, comprising a microcode patch loaded by a device external to the processor if the processor is determined not to be authorized to be in operation;
    wherein the microcode patch is loaded into the memory storage area prior to the start of a boot-up of the processor; and
    wherein the microcode patch, when executed by the processor, operates to disable the processor.

2. A COD system as defined in claim 1, wherein the memory storage area is integral to the processor.

3. A COD system as defined in claim 1, wherein the COD system comprises a COD server including a second processor having its own memory storage area and a controller loads the microcode patch on to the second processor's storage area if the second processor is not authorized to be in operation.

4. A COD system as defined in claim 3, wherein the COD system comprises a COD server that uses an open source operating system (OS).

5. A COD system as defined in claim 1, further comprising:
    a read-only-memory (ROM) coupled to the processor, the ROM stores the microcode patch.

6. A COD system as defined in claim 1, wherein the controller receives instructions as to whether or not the processor is authorized from a remotely located availability controller.

7. A method for managing processor availability in a computer system having a plurality of processors, comprising:
    determining if each of the plurality of processors is authorized or not authorized to be in operation; and
    associating, by a device external to the plurality of processors, a disabling microcode patch with any of the plurality of processors that are determined not to be authorized to be in operation which causes them to become disabled, the associating performed before starting to boot up the plurality of processors.

8. A method as defined in claim 7, further comprising:
    removing any of the plurality of processors from one or more advanced configuration and power interface (ACPI) tables associated with those processors from the plurality of processors that are determined not authorized to be in operation.

9. A method as defined in claim 7, further comprising:
    disabling the processing resource's ability to respond to any startup commands on those processors determined not authorized to be in operation.

10. A method as defined in claim 7, further comprising:
    disabling the ability to load a new microcode patch onto any of the plurality of processors that are determined not authorized to be in operation until the next power up of the computer system.

11. A method as defined in claim 7, wherein the computer system comprises a capacity-on-demand (COD) computer server.

12. A method as defined in claim 7, further comprising:
    loading a microcode patch onto any of the plurality of processors that are determined to be authorized to be in operation that allows the plurality of processors to function in a normal fashion.

13. A method as defined in claim 7, wherein determining if the plurality of processors are authorized or not authorized to be in operation is performed by a COD manager that is local to the plurality of processors.

14. A method as defined in claim 13, wherein the COD manager receives information as to which of the plurality of processors are authorized or not authorized for operation from a remote COD availability controller.

15. A method as defined in claim 7, wherein the step of loading a disabling microcode patch onto any of plurality of processors that are determined not to be authorized to be in operation includes loading the disabling microcode patch onto one or more processor cores that may be part of the one or more of the plurality of processors in order to disable each processor core separately that are determined not authorized to be in operation.

16. A capacity-on-demand (COD) server, comprising:
    a plurality of processors;
    a read-only memory (ROM) coupled to the plurality of processors, the ROM including a disabling microcode patch which when loaded onto one or more of the plurality of processors causes them to be disabled from operating properly; and
    means, external to the plurality of processors, for determining if one or more of the plurality of processors, is supposed to be inactive and for loading the disabling microcode patch onto the processors that are supposed to be inactive, wherein the microcode patch is loaded before starting to boot the plurality of processors.

17. A COD server as defined in claim 16, wherein the disabling microcode patch does not allow proper booting-up of any of the plurality of processors that have the disabling microcode patch loaded.

18. A COD server as defined in claim 17, further comprising:
    a system memory coupled to the plurality of processors, the system memory includes multi-processor specification (MPS) and advanced configuration and power interface (ACPI) tables for each of the plurality of processors.

19. A COD server as defined in claim 18, wherein the disabling microcode patch causes those processors from the plurality of processors loaded with the disabling microcode patch to be removed from the MPS or ACPI tables so that an operating system used with the COD server does not see them as available.

20. A COD server as defined in claim 16, wherein one or more of the plurality of processors include a plurality of processor cores, and the means for determining if one or more of the plurality of processors, is supposed to be inactive, determines if any of the plurality of processor cores is supposed to be inactive and loads the disabling microcode patch onto those processor cores that are supposed to be inactive.

21. A capacity on demand (COD) system, comprising:
   a physical processor including a plurality of logical processors; and
   means, external to the physical processor, for determining which of the plurality of logical processors is supposed to be inactive and for loading a disabling microcode patch onto those logical processors that are supposed to be inactive, wherein the microcode patch is loaded before starting to boot the plurality of logical processors.

22. A COD system as defined in claim 21, wherein the means for determining which of the plurality of logical processors is supposed to be inactive and for loading the disabling microcode patch comprises a COD controller local to the physical processor.

23. A COD system as defined in claim 22, wherein the disabling microcode disables the logical processors that are supposed to be inactive by not allowing them to function normally.

* * * * *